United States Patent [19]
Luo et al.

[11] Patent Number: 6,008,932
[45] Date of Patent: Dec. 28, 1999

[54] ERBIUM-DOPED FIBER AMPLIFIER WITH AUTOMATIC GAIN CONTROL

[75] Inventors: Gengxian Luo, Aberdeen; Atul K. Srivastava, Eatontown; James W. Sulhoff, Ocean; Yan Sun, Aberdeen; John L. Zyskind, Shrewsbury, all of N.J.

[73] Assignee: Lucent Technologies Inc., Murray Hill, N.J.

[21] Appl. No.: 08/946,469

[22] Filed: Oct. 7, 1997

Related U.S. Application Data

[60] Provisional application No. 60/028,920, Oct. 7, 1996.

[51] Int. Cl.$^6$ .................. H01S 3/30; G02B 6/26
[52] U.S. Cl. ............ 359/337; 359/341; 359/346; 372/18; 372/29
[58] Field of Search ................ 359/337, 340, 359/341, 346; 372/18, 29, 31

[56] References Cited

U.S. PATENT DOCUMENTS

| | | | |
|---|---|---|---|
| 5,239,607 | 8/1993 | da Silva et al. | 385/122 |
| 5,633,964 | 5/1997 | DiGiovanni et al. | 385/27 |

OTHER PUBLICATIONS

Sirvastava et al, OFC'96, vol. 2, Tech. Digest, pp. 33–34, Mar. 1, 1996; abst. only herewith.

A.K. Srivastava et al. Optical Fiber Communications Conference, vol. 2, OSA Technical Digest Series (Optical Society of America, Washington, D.C.), 1996, pp. 33–34.

Robert G. Winch, "Telecommunication Transmission Systems", McGraw Hill, 1993, pp. 335–337.

Robert G. Winch, "Telecommunication Transmission Systems", McGraw Hill, 1993, pp. 355–374.

*Primary Examiner*—Nelson Moskowitz

[57] ABSTRACT

An Erbium doped fiber amplifier (EDFA) is placed in a laser cavity to clamp the gain of the amplifier. The laser cavity is preferably formed to minimize the effects of relaxation oscillations and of spectral hole burning. In a preferred embodiment, the laser cavity supports a lasing wavelength which makes the saturation energy at the laser wavelength less than that at the signal wavelengths. In an erbium doped fiber implementation, the laser wavelength is shorter than that of the signal wavelengths and is separated from them by no more than approximately 75% of the width of the spectral hole. The compounding of relaxation oscillations may be substantially eliminated by varying the length of the fiber within each laser cavity within a system to change the photon round-trip time within each cavity.

24 Claims, 3 Drawing Sheets

ERBIUM-DOPED FIBER AMPLIFIER WITH AUTOMATIC GAIN CONTROL

This application claims the benefit of Provisional application Ser. No. 60/028,920 filed Oct. 7, 1996.

BACKGROUND OF THE INVENTION

1. Field of the Invention

The present invention relates generally to rare-earth doped fiber amplifiers, and, more particularly, to automatic gain control of such amplifiers.

2. Description of the Related Art

Optical fiber communication systems have evolved rapidly over the past twenty years, with substantial increases in both bit rate and repeater spacing. Although, to this point, intensity modulation systems have found most widespread use, coherent systems, that is, systems which mix a weak optical signal with a relatively strong local optical oscillator hold forth the promise of substantial improvements in capacity, bit error rate and repeater spacing distances. Coherent systems could closely approach quantum limit performance. Wavelength division multiplexing (WDM) systems and frequency division multiplexing systems are examples of coherent system. Suitable amplifiers will be required for such systems. One candidate is the rare-earth doped fiber amplifier which typically employs Erbium as the doping material and is therefore commonly referred to as an Erbium doped fiber amplifier (EDFA). With the addition of multi-plexing capabilities, the amplifier could act as a system node, in addition to acting as an amplifier.

Although suitable in many ways, a conventional EDFA would experience gain transients with the deletion or addition of one or more channels, due for example, to channel failure or bursty traffic. These transients would be reflected in the remaining channels and could cause substantial degradation in the system's bit error rate.

SUMMARY OF THE INVENTION

The invention is directed to a rare-earth-doped fiber amplifier, which, for the sake of convenience, will be referred to as an erbium doped fiber amplifier (EDFA), which maintains a relatively stable gain in spite of EDFA cross saturation which may occur, for example, in response to the elimination of a wavelength division multiplexed signal channel or to "bursty" traffic on such channels. The amplifier employs laser automatic gain control to stabilize the gain of the EDFA and to substantially reduce the negative effects of relaxation oscillations and spectral hole burning typically associated with laser automatic gain control.

In a presently preferred embodiment, an Erbium doped fiber amplifier (EDFA) is placed in a laser cavity, such as a ring laser cavity or a linear laser cavity, which clamps the gain of the amplifier. The laser cavity is preferably formed to minimize the effects of relaxation oscillations and of spectral hole burning. In one aspect of the invention, the laser cavity supports a lasing wavelength which produces a saturation power for the laser that is less than that at the signal wavelength. In the presently preferred erbium-doped fiber amplifier, the laser wavelength is shorter than that of the wavelengths of signals that are to be amplified. Additionally, the lasing wavelength is preferably separated from the signal wavelengths by an amount which may be arbitrarily small, but which is no greater than approximately 75% of the width of the spectral hole. In another aspect of the invention the compounding of relaxation oscillations are substantially reduced by varying the length of the fiber within the laser cavity to change the photon round-trip time within the cavity. This modification of photon round-trip time is preferably accomplished by including in the cavity normal transmission fiber, that is, non-Erbium doped fiber so that the total length of the cavity, although as short as practicable, is different for each amplifier within a multi-amplifier system.

The new laser automatic gain control erbium doped fiber amplifier is particularly suited to application in coherent optical transmission systems such as wavelength division multiplexing systems or frequency division multiplexing systems, such as an optical amplifier, for example.

These and other features, aspects and advantages of the invention will be apparent to those skilled in the art from the following detailed description, taken together with the accompanying drawings.

DETAILED DESCRIPTION OF THE DRAWINGS

DETAILED DESCRIPTION OF THE INVENTION

The new erbium-doped fiber amplifier employs laser automatic gain control to stabilize the gain of the EDFA and substantially reduces the negative effects of relaxation oscillations and the spectral hole burning typically associated with laser EDFAs. Spectral hole burning is due to inhomogeneity of the erbium gain medium and is discussed, for example, in A. K. Srivastava, et al., Optical Fiber Communications Conference, Vol. 2, OSA Technical Digest Series (Optical Society of America, Washington, D.C.), 1996, pages 33–34, which is incorporated herein by reference.

In a preferred embodiment, an EDFA is placed in a laser cavity which clamps the gain of the amplifier. The laser cavity is preferably formed to minimize the effects of relaxation oscillations and of spectral hole burning. In one aspect of the invention, the laser cavity supports a lasing wavelength which is shorter than that of wavelengths of signals that are to be amplified. Additionally, the lasing wavelength is preferably separated from the signal wavelengths by an amount which may be arbitrarily small, but no more than approximately 75% of the width of the EDFA's associated spectral hole. In another aspect of the invention, the compounding of relaxation oscillations within a WDM system which employs a plurality of the new EDFAs is substantially reduced by varying the length of a transmission fiber within the laser cavity to change the photon round-trip time within the cavity. This modification of photon round-trip time is preferably accomplished by including in the cavity normal transmission fiber, so that the total cavity is as short as practicable, yet the cavity lengths of amplifiers within a multi-amplifier system vary from amplifier to amplifier.

Figure 1A:
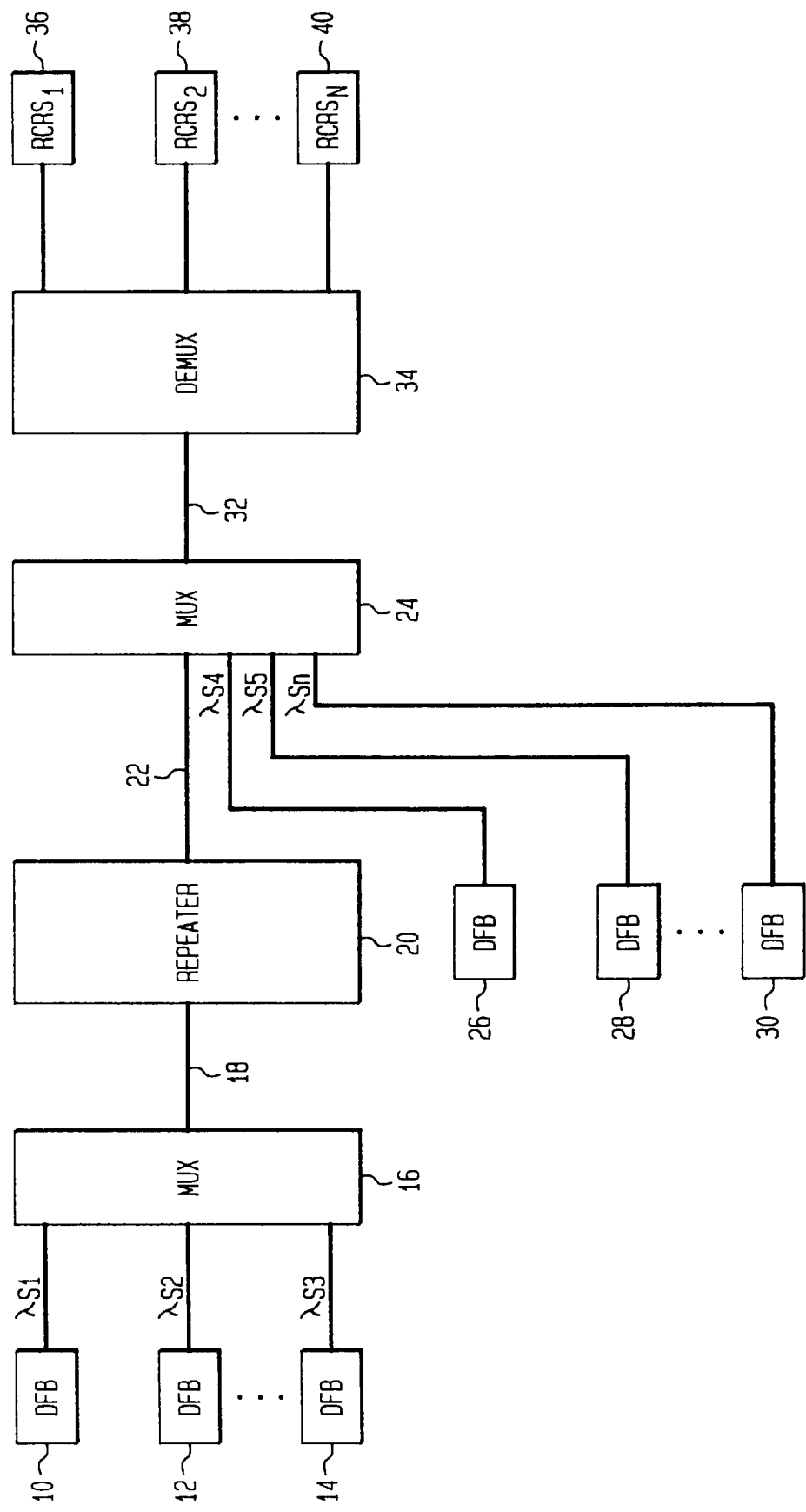
FIG. 1A is a block diagram of a wavelength division multiplexing communications system which may suitably employ the new erbium-doped fiber amplifier with laser automatic gain control in accordance with the present invention.

A wavelength division multiplexing communication system 100 which employs the new gain-control EDFA is illustrated in the block diagram of FIG. 1A. Coherent optical communication systems are discussed in Robert G. Winch, "Telecommunication Transmission Systems", McGraw Hill, 1993, pages 355–374, which are hereby incorporated by reference. In general, signal sources 10, 12, 14 employ narrowband light sources, such as distributed feedback laser diodes (DFB), to generate light signals, with each signal channel corresponding to a DFB wavelength, $\lambda_{S1}$, $\lambda_{S2}$, $\lambda_{S3}$. The light signals $\lambda_{S1}$, $\lambda_{S2}$, $\lambda_{S3}$ are routed to a multiplexer 16 which combines the signals onto a single fiber 18 for transmission. The multiplexer 16 acts as a system node in this illustrative example and the new gain-controlled EDFA, which will be described in greater detail in relation to FIG. 2, may be employed as the mux 16 to combine and amplify signals $\lambda_{S1}$, $\lambda_{S2}$, and $\lambda_{S3}$. Depending upon a number of factors, the length of the fiber 18 may reach a point at which repeaterless operation is no longer possible. In such a case, a repeater 20 is added to the system to amplify the signals $\lambda_{S1}$–$\lambda_{S3}$. The new gain-controlled EDFA may by utilized as an optical amplifier in such a case.

An optical fiber 22, preferably a single mode fiber, carries the amplified signals to a node 24 which multiplexes these signals with signals $\lambda_{S4}$, $\lambda_{S5}$, and $\lambda_{Sn}$, originating at sources 26, 28, and 30. Once again, the new gain-controlled EDFA may be used as the node 24 in order to multiplex and amplify the signals $\lambda_{S1}$–$\lambda_{Sn}$. An optical fiber 32 carries signals from the node 24 to a demultiplexer 34, which demultiplexes the signals and sends them to receivers 36, 38, and 40, respectively.

Should any signal channel be lost, $\lambda_{S1}$ for example, relatively fast power transients would tend to be impressed upon the remaining signal channels, $\lambda_{S2}$–$\lambda_{Sn}$, by an EDFA. However, as discussed in greater detail in relation to FIG. 2, transients due to non-ideal gain control related to spectral hole burning and relaxation oscillations are substantially reduced in the new laser gain control EDFA.

Figure 1B:
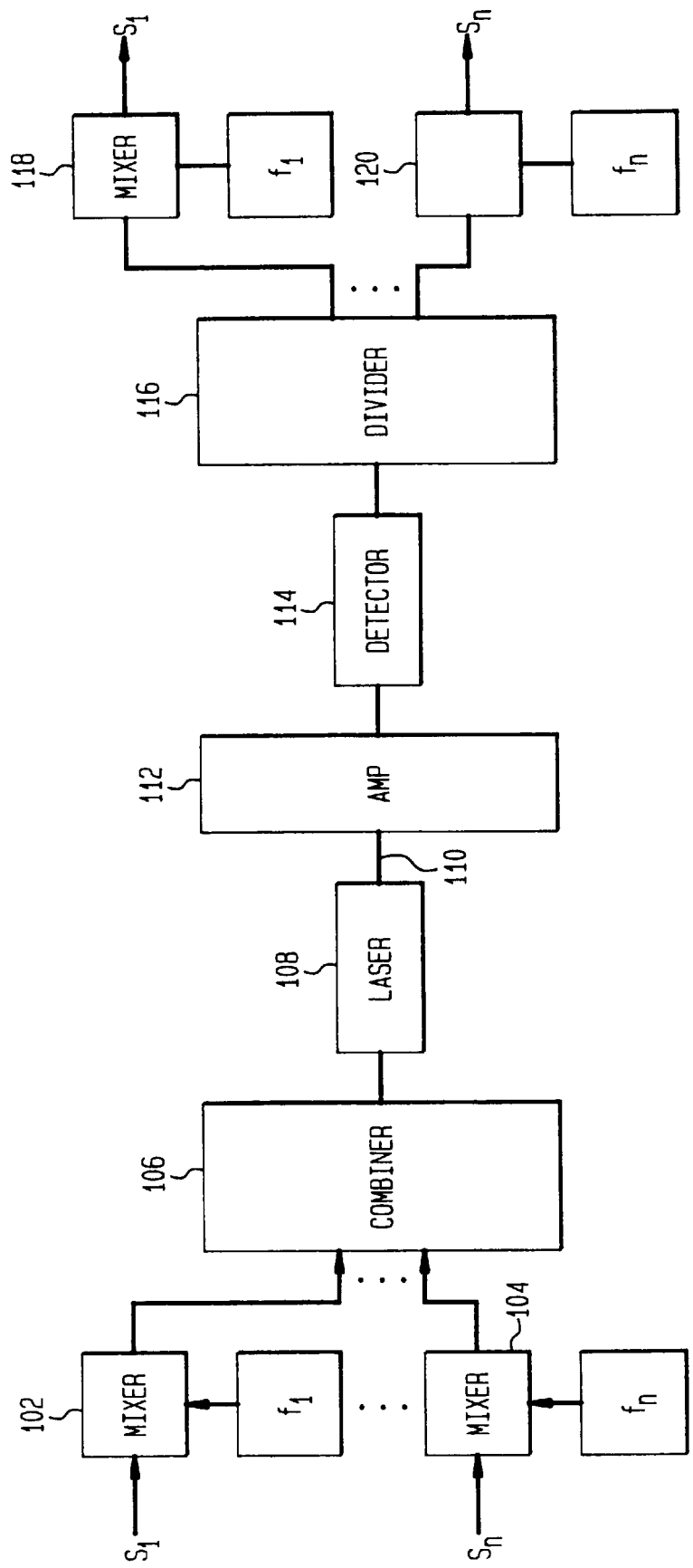
FIG. 1B is a block diagram of a frequency division multiplexing communications system which may suitably employ the new fiber amplifier.

Similarly, a frequency division multiplexing system, such as that illustrated in the block diagram of FIG. 1B could suitably employ the new automatic gain controlled EDFA. Light signals S1–Sn are mixed with respective local oscillators f1–fn by respective mixers, 102, 104. A combiner 106 combines the mixed signals and a laser 108, preferably operating at approximately 1550 nm, acts as the carrier for the combined signals. The modulated laser light is coupled onto a transmission fiber, preferably a single mode fiber 110 and is amplified by an amplifier 112. The new automatic gain-controlled EDFA is used as the amplifier 112 in this exemplary embodiment. After amplification, the signal is coupled to a detector 114 and the detected signal is coupled to a divider 116. Following the divider 116, the divided signal is mixed at respective mixers 118 and 120 with local oscillators f1 and fn to obtain signals S1 and Sn.

Figure 2:
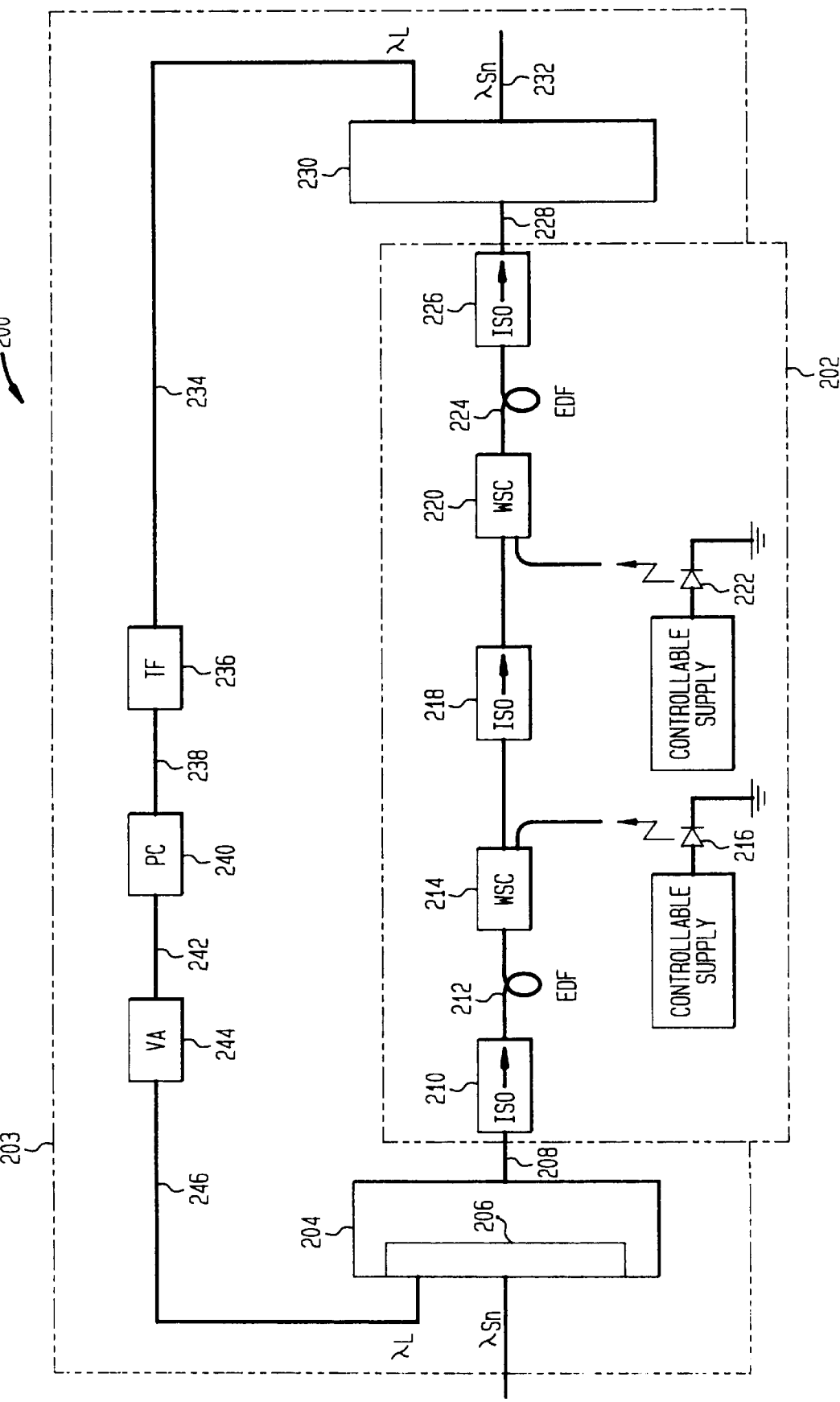
FIG. 2 is a block diagram of an erbium-doped fiber amplifier with laser automatic gain control in accordance with the present invention.

The block diagram of FIG. 2 illustrates the major components of a new automatic gain controlled EDFA 200 in accordance with the present invention. The new EDFA can conveniently by viewed as an amplifier section 202 and a laser cavity section 203. The amplifier section 202 includes a bandpass wavelength division multiplexer BWDM 204 connected to receive a light signal or signals, and laser light from the laser cavity 204 at an input port 206 and to co-propagate along a transmission fiber 208. The combined light, that is, light from the light signals and the laser cavity 204 passes through the transmission fiber to an isolator 210 which blocks backward scattering. Light exits the isolator 210 and enters a doped fiber, preferably erbium-doped, 212 where it is amplified in accordance with techniques known in the art. Doped fiber amplifiers are discussed in Robert G. Winch, "Telecommunication Transmission Systems", McGraw Hill, 1993, pages 335–337, and in U.S. Pat. No. 5,633,964 issued to DiGiovanni, et al., entitled ARTICLE COMPRISING A MULTI-STAGE ERBIUM DOPED FIBER AMPLIFIER, which are both hereby incorporated by reference in their entirety.

A wavelength selective coupler 214 is connected to couple light from a pump laser 216, preferably operating at 980 nm, into the doped fiber 212, thereby amplifying light signals and laser light introduced from the isolator 210. An isolator 218 is connected between the wavelength selective coupler 214 and a second wavelength selective coupler 220 to block backward scattering of the light. A second pump laser 222 is connected to the wavelength selective coupler 220 which also preferably operates at 980 nm. The coupler 220 couples light from the second pump laser 222 into a second doped fiber 224 for further amplification. Amplified light from the second doped fiber 224 travels to a third isolator 226 which is connected to block backward scattering. A transmission fiber 228 connects the isolator 226 to a second bandpass wavelength division multiplexer 230 which is connected to de-multiplex the amplified signal light $\lambda_S$, and the laser light $\lambda_L$, thereby passing the amplified light signals to an output fiber 232 and routing the laser light to the remainder of the laser cavity 203.

The laser cavity 203 includes an optical fiber 234 connected to receive cavity laser light from the bandpass wavelength division multiplexer 230 and to transmit that light to a tunable optical bandpass filter 236 which filters light having a wavelength other than that of a cavity laser. Cavity laser light travels from a tunable filter 236 through transmission fiber 238 to a polarization controller 240, where the polarization of the cavity laser light is controlled, as desired. An optical fiber 242 carries laser light from the polarization controller to a variable attenuator 244 and a transmission fiber carries cavity laser light from the variable attenuator 244 to the input port of bandpass wavelength division multiplexer 204.

The laser cavity loop 203 provides negative feedback to the amplifier loop 202, thereby stabilizing the output level of light signals which are amplified by the amplifying section. This is especially critical when light signals from one or more channels are lost. Without the negative feedback afforded by the laser cavity loop, significant transients are imposed upon the surviving channels that are amplified by the EDFA. In operation, light traveling around the path that includes the cavity laser 203 and amplifier 202 is amplified at each EDF and experiences losses at every other component with the loop. At startup, the loop gain will be greater than loop losses and light transiting the loop, having a wavelength $\lambda_L$, will experience a net gain. As the laser light increases in intensity, the EDFAs 212 and 224 will become saturated and the condition for lasing action, that is, loop gain equaling loop losses, will be met and laser operation will be established. Should a light signal $\lambda_{S_n}$ be lost due to bursty signaling or to the loss of a signal channel, for example, the saturation level of the EDFAs will decrease, leading to an increase in laser power. This increase in laser power will act to reverse the EDFAs' loss of saturation, thereby clamping the output level of "surviving" light signals.

In the presently preferred embodiment, the laser cavity 203 supports a lasing wavelength which is shorter than that of the wavelengths of signals that are to be amplified. Additionally, the lasing wavelength is preferably separated from the signal wavelengths by an mount that may be arbitrarily small, but no more than approximately 75% of the width of the spectral hole. The spectral hole width will typically be 4.5 to 6 nm, depending upon the spectral range of the signals. Additionally, the length of transmission fiber included within the laser cavity 203 is set to a length which allows the total cavity length to be as short as practicable, yet, in a multi-amplifier system, establishes different cavity lengths for each of the amplifiers in order to modify the photon round-trip time within each cavity. In this way, each of the new gain-controlled EDFAs 200 employed within a system could operate with a different photon round-trip time and, consequently, the compounding of relaxation oscillations through a series of EDFAs would be substantially reduced.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described in order to best explain the principles of the invention and its practical application, to thereby enable others skilled in the art to best utilize the invention. It is intended that the scope of the invention be limited only by the claims appended hereto.

We claim:

1. A gain-controlled rare-earth doped fiber amplifier (EDFA), comprising:
   an EDFA connected to receive a plurality of narrowband light signals having wavelengths $\lambda_{Sn}$, and
   a laser cavity connected so as to provide the EDFA with negative feedback and thereby clamp the gain of said EDFA, the lasing wavelength of said laser cavity being selected such that the saturation power at the laser wavelength is less than that at the signal wavelengths and the laser wavelength is separated from said signal wavelengths by no more than approximately 75% the associated EDFA spectral hole width.

2. The fiber amplifier of claim 1, wherein said laser cavity includes a wavelength selective element connected to filter light other than that at the desired lasing wavelength.

3. The fiber amplifier of claim 2, wherein said laser cavity includes a polarization controller connected to maintain a desired polarization for the laser light.

4. The fiber amplifier of claim 3, wherein said laser cavity includes a loss element connected to attenuate said laser light.

5. The fiber amplifier of claim 4, wherein said EDFA includes a bandpass wavelength division multiplexer connected to multiplex said laser light and said signal light so that they co-propagate through the EDFA.

6. The amplifier of claim 5, wherein said EDFA includes isolators connected to substantially reduce the back-propagation of light within said EDFA.

7. A gain-controlled rare-earth doped fiber amplifier (EDFA), comprising:
   an EDFA connected to receive a plurality of narrowband light signals having wavelengths centered on signal wavelengths $\lambda_{Sn}$, and
   a laser cavity connected so as to provide the EDFA with negative feedback and thereby clamp the gain of said EDFA, said laser cavity including a length of transmission fiber optic material the length of which is set to determine the photon round-trip time within said laser cavity.

8. The fiber amplifier of claim 7, wherein said length of said transmission fiber is selected to keep the total cavity length as short as practicable.

9. The fiber amplifier of claim 8, wherein said laser cavity includes a wavelength selective element connected to filter light other than that at the desired lasing wavelength.

10. The fiber amplifier of claim 9, wherein said laser cavity includes a polarization controller connected to maintain a desired polarization for the laser light.

11. The fiber amplifier of claim 10, wherein said laser cavity includes a loss element connected to attenuate said laser light.

12. The fiber amplifier of claim 11, wherein said EDFA includes a bandpass wavelength division multiplexer connected to multiplexer said laser light and said signal light so that they co-propagate through EDFA.

13. The fiber amplifier of claim 12, wherein said EDFA includes isolators connected to substantially reduce the back-propagation of light within said EDFA.

14. A gain-controlled rare-earth doped fiber amplifier (EDFA), comprising:
    an EDFA connected to receive a plurality of narrowband light signals having wavelengths centered on signal wavelengths $\lambda_{Sn}$, and
    a laser cavity connected so as to provide the EDFA with negative feedback and thereby clamp the gain of said EDFA, the lasing wavelength of said laser cavity being selected such that the saturation power at the laser wavelength is less than that at the signal wavelengths and the laser wavelength is separated from signal wavelengths and the laser wavelength is separated from said signal wavelengths by no more than approximately 75% of the associated EDFA spectral hole width, said laser cavity including a length of transmission fiber optic material the length of which is set to determine the photon round-trip time within said laser cavity.

15. The fiber amplifier of claim 14, wherein said laser cavity includes a wavelength selective element connected to filter light other than that at the desired lasing wavelength.

16. The fiber amplifier of claim 15, wherein said laser cavity includes a polarization controller connected to maintain a desired polarization for the laser light.

17. The fiber amplifier of claim 16, wherein said laser cavity includes a loss element connected to attenuate said laser light.

18. The fiber amplifier of claim 17, wherein said EDFA includes a bandpass wavelength division multiplexer connected to multiplex said laser light and said signal light so that they co-propagate through the EDFA.

19. The fiber amplifier of claim 18, wherein said EDFA includes isolators connected to substantially reduce the back-propagation of light within said EDFA.

20. A coherent optical communication transmission system, comprising:
    light sources connected to provide narrowband light signals centered around signal wavelengths $\lambda_{Sn}$,
    optical multiplexers connected to multiplex said light signals onto optical fibers,
    demultiplexers connected to demultiplex said light signals,
    optical receivers connected to receive said demultiplexed light signals from said demultiplexers, and
    a laser cavity gain controlled EDFA connected to provide gain for said light signals, wherein said laser cavity gain controlled EDFA includes
        an EDFA connected to receive a plurality of narrowband light signals having wavelengths centered on signal wavelengths $\lambda_{Sn}$, and a laser cavity connected to clamp the gain of said EDFA, the lasing wavelength of said laser cavity being selected such that the saturation power at the laser wavelength is less than that at the signal wavelengths.

21. The coherent transmission system of claim 20 wherein the laser wavelength is separated from said signal wavelengths by no more than approximately 75% of the associated EDFA spectral hole width.

22. The coherent transmission of claim 21, wherein said laser cavity including a length of transmission fiber optic material, the length of which is set to determine the photon round trip time within said laser cavity.

23. The coherent transmission system of claim 22, wherein said system is a wavelength division optical transmission system.

24. The coherent transmission system of claim 22, wherein said system is a frequency division optical transmission system.

* * * * *